US006282169B1

United States Patent
Kiremidjian

(10) Patent No.: US 6,282,169 B1
(45) Date of Patent: Aug. 28, 2001

(54) SERIAL REDUNDANT BYPASS CONTROL MECHANISM FOR MAINTAINING NETWORK BANDWIDTH MANAGEMENT SERVICE

(75) Inventor: Frederick Kiremidjian, Danville, CA (US)

(73) Assignee: Amplify.net Inc., Fremont, CA (US)

( * ) Notice: Subject to any disclaimer, the term of this patent is extended or adjusted under 35 U.S.C. 154(b) by 0 days.

(21) Appl. No.: 09/332,357

(22) Filed: Jun. 11, 1999

(51) Int. Cl.⁷ .................................................. H04L 12/26
(52) U.S. Cl. ............................................. 370/220; 370/228
(58) Field of Search .................................... 370/217, 220, 370/225, 228, 216, 218, 219, 221, 222, 223, 224, 226, 227

(56) References Cited

U.S. PATENT DOCUMENTS

| | | | | |
|---|---|---|---|---|
| 3,715,503 | * | 2/1973 | Jungbluth et al. | 370/217 |
| 4,002,847 | * | 1/1977 | Dail | 370/217 |
| 4,455,645 | * | 6/1984 | Mijioka et al. | 370/217 |
| 5,109,296 | * | 4/1992 | Fukushima et al. | 370/225 |
| 5,193,086 | * | 3/1993 | Satomi et al. | 370/228 |
| 5,282,193 | * | 1/1994 | Iino et al. | 370/225 |
| 5,440,538 | * | 8/1995 | Olsen | 370/220 |
| 5,627,837 | * | 5/1997 | Gillett | 370/220 |
| 5,715,237 | * | 2/1998 | Akiyoshi | 370/228 |
| 5,777,761 | * | 7/1998 | Fee | 370/225 |
| 5,793,746 | * | 8/1998 | Gerstel et al. | 370/228 |
| 5,799,001 | * | 8/1998 | Lee et al. | 370/217 |
| 5,875,172 | * | 2/1999 | Tabata | 370/228 |
| 5,959,972 | * | 9/1999 | Hamami | 370/228 |

\* cited by examiner

Primary Examiner—Chau Nguyen
Assistant Examiner—Phuongchau Ba Nguyen

(74) Attorney, Agent, or Firm—Gray Cary Ware & Freidenrich LLP

(57) ABSTRACT

A serial redundant bypass control mechanism for maintaining network bandwidth management service includes a first and second bypass control module, a first and second bandwidth management control module, and a first bypass connector line connecting the first bypass control module to the second bypass control module. Under normal conditions, a network signal is received at the first bypass control module and transported to the first bandwidth management control module. The first bandwidth management control module performs bandwidth management services on the network signal and transports the network signal back to the first bypass control module. The first bypass control module then transports the network signal to the second bypass control module along the first bypass connector line. Next, the second bypass control module transports the network signal to the second bandwidth management control module. Since bandwidth management services have already been performed on the network signal, the second bandwidth management control module transports the network signal back to the second bypass control module and outputs the network signal.

If the first bandwidth management control module fails, the network signal is received at the first bypass control module and transported directly to the second bypass control module along the first bypass connector line, thus bypassing the failed first bandwidth management control module. The network signal is then transported to the second bandwidth management control module where bandwidth management services are performed on the network signal. The second bandwidth management control module then transports the network signal back to the second bypass control module and outputs the network signal.

7 Claims, 5 Drawing Sheets

SERIAL REDUNDANT BYPASS CONTROL MECHANISM FOR MAINTAINING NETWORK BANDWIDTH MANAGEMENT SERVICE

TECHNICAL FIELD OF THE INVENTION

The present invention relates generally to network bandwidth management service. In particular, this invention relates to a serial redundant bypass control mechanism for maintaining network bandwidth management service upon failure of a bandwidth management control module.

BACKGROUND OF THE INVENTION

Market entry and customer share have always been a key focus for network service providers. In the past, network service providers offered flat fees for unlimited bandwidth usage and guaranteed uninterrupted intenet service to entice new customers. To accommodate increasing internet traffic and guarantee uninterrupted service, network service providers would increase the bandwidth up to 50% more than was actually needed. While customers were happy, it was not long before network service providers realized that they would not be able to stay in business by offering a flat fee bandwidth supply cost structure to all subscribing customers regardless of actual customer usage. Network service providers needed a viable method of measuring and charging customers for actual bandwidth usage, thus the advent of real-time network bandwidth management service.

Real-time network bandwidth management service has become very important to network service providers. Internet Service Providers (ISP's) rely on real-time network bandwidth management service to monitor usage accounting and customer billing, to obtain usage and capacity scheduling information for planning future growth of the network, and to analyze unusual bandwidth patterns which may signify problems with the server or the ISP's equipment. Corporate Information Technology (IT) departments rely on real-time network bandwidth management service to control bandwidth expenses by monitoring usage pattern and behavior. Independent service providers rely on information obtained from real-time network bandwidth management service to design service level agreements (SLA's) and associated tariff structures to maximize profits. Furthermore, customers demand accountability for the access bandwidth charges by their ISP's.

Various techniques for real-time network bandwidth management service have been deployed with varying degrees of success. One technique is to modify the application bandwidth inside a network server. Another technique is to modify a network router with a Quality of Service (QOS) scheme. These methods are only marginally effective and offer limited performance because they use existing platforms optimized for other applications. A more popular technique utilizes a separate network bandwidth management control unit placed between a network router and switch. The separate network bandwidth management control unit is specifically designed to monitor customer bandwidth usage. However, the problem with this technique is that failure of the network bandwidth management control unit will cause an interrupt in customer network access and loss of customer bandwidth management data.

Considering the importance of network bandwidth management service information to network service providers and their customers, any interruption in network service or loss of network bandwidth management data could be very costly. A current method for avoiding network interruption due to failure of a bandwidth management control unit utilizes a bypass switch mechanism which bypasses the bandwidth management control unit and connects the network signal directly from the network router to the network switch. Although this prior art method avoids the problem of network access interruption, it does not resolve the problem of losing the critical network bandwidth management data.

SUMMARY OF THE INVENTION

The present invention provides a system and method for network bandwidth management that substantially eliminates or reduces disadvantages and problems associated with previously developed bandwidth management systems and methods. In particular, this invention relates to a serial redundant bypass control mechanism for maintaining network bandwidth management service in the event a bandwidth management control module fails.

More specifically, the present invention provides a serial redundant bypass control mechanism for maintaining network bandwidth management data upon failure of the bandwidth management control module. The serial redundant bypass control mechanism for maintaining network bandwidth management service includes a first and second bypass control module, a first and second bandwidth management control module, and a first bypass connector line connecting the first bypass control module to the second bypass control module. Under normal conditions, a network signal is received at the first bypass control module and transported to the first bandwidth management control module. The first bandwidth management control module performs bandwidth management services on the network signal and transports the network signal back to the first bypass control module. The first bypass control module then transports the network signal to the second bypass control module along the first bypass connector line. Next, the second bypass control module transports the network signal to the second bandwidth management control module. Since bandwidth management services have already been performed on the network signal, the second bandwidth management control module transports the network signal back to the second bypass control module. The second bypass control module then outputs the network signal.

If the first bandwidth management control module fails, the network signal is received at the first bypass control module and transported directly to the second bypass control module along the first bypass connector line, thus bypassing the failed first bandwidth management control module. The network signal is then transported to the second bandwidth management control module where bandwidth management services are performed. The second bandwidth management control module then transports the network signal back to the second bypass control module and outputs the network signal.

The present invention provides an important technical advantage by providing a serial redundant bypass control mechanism which ensures uninterrupted customer network access.

The present invention provides another important technical advantage by providing a serial redundant bypass control mechanism for maintaining network bandwidth management service upon failure of a bandwidth management control module.

The present invention provides another important technical advantage by providing a serial redundant bypass control mechanism which allows a failed bandwidth management control unit to be replaced without interrupting network access or network bandwidth management service.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Network bandwidth management service is very important to network service providers. Network bandwidth management data provides important information such as usage accounting for customer billing, capacity scheduling information for planning future growth of the network, or bandwidth patterns which may signify problems with the server or the ISP's equipment.

Figure 1:
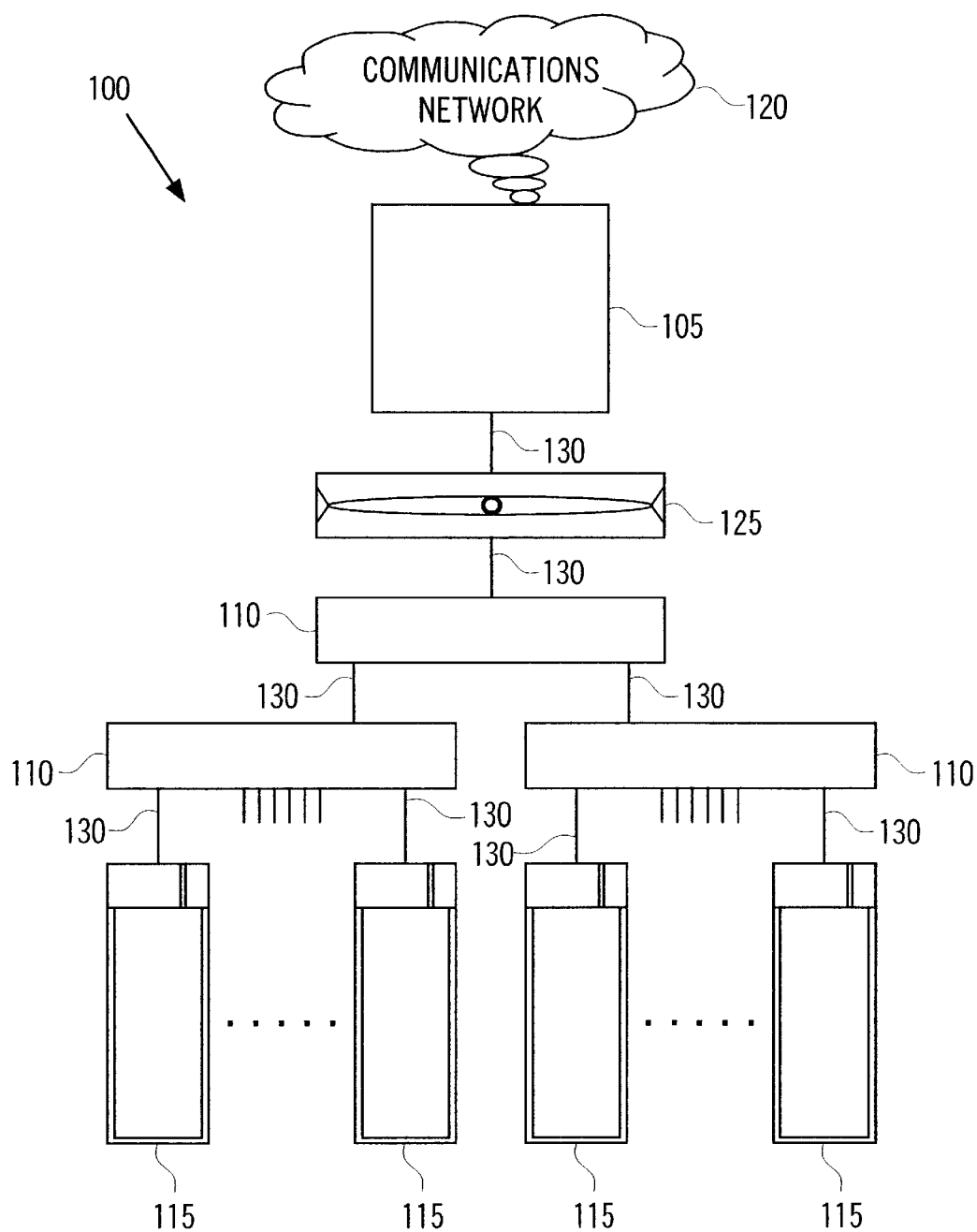
FIG. 1 shows an embodiment of the serial redundant bypass control mechanism for maintaining network bandwidth management service in a communications network environment.

One technique used to capture network bandwidth management data is shown in FIG. 1. FIG. 1 shows a bandwidth management control unit 125 in a communications network environment 100. The communications network environment 100 includes the bandwidth management control unit 125 connected to a network router 105 and a network switch 110 by a network signal lines 130. The network router is connected to a communications network 120 by a network signal line 130 and the network switch 110 is connected to other network switches 110 by network signal lines 130. The network switches 110, are then connected to multiple network servers 115 by network signal lines 130.

A network signal will travel from the communications network 120 to the network router 105. Next, the network signal will pass through the bandwidth management control unit where bandwidth management services are performed, yielding the desired bandwidth management data. The network signal then is transported through multiple network switches 110 and on to multiple network servers 115. The problem with this communications network configuration 100 is that if the bandwidth management control unit 125 fails, the critical bandwidth management data and customer network access are lost. Paying network customers become very unhappy with their network service providers whenever customer network access is interrupted.

Figure 2:
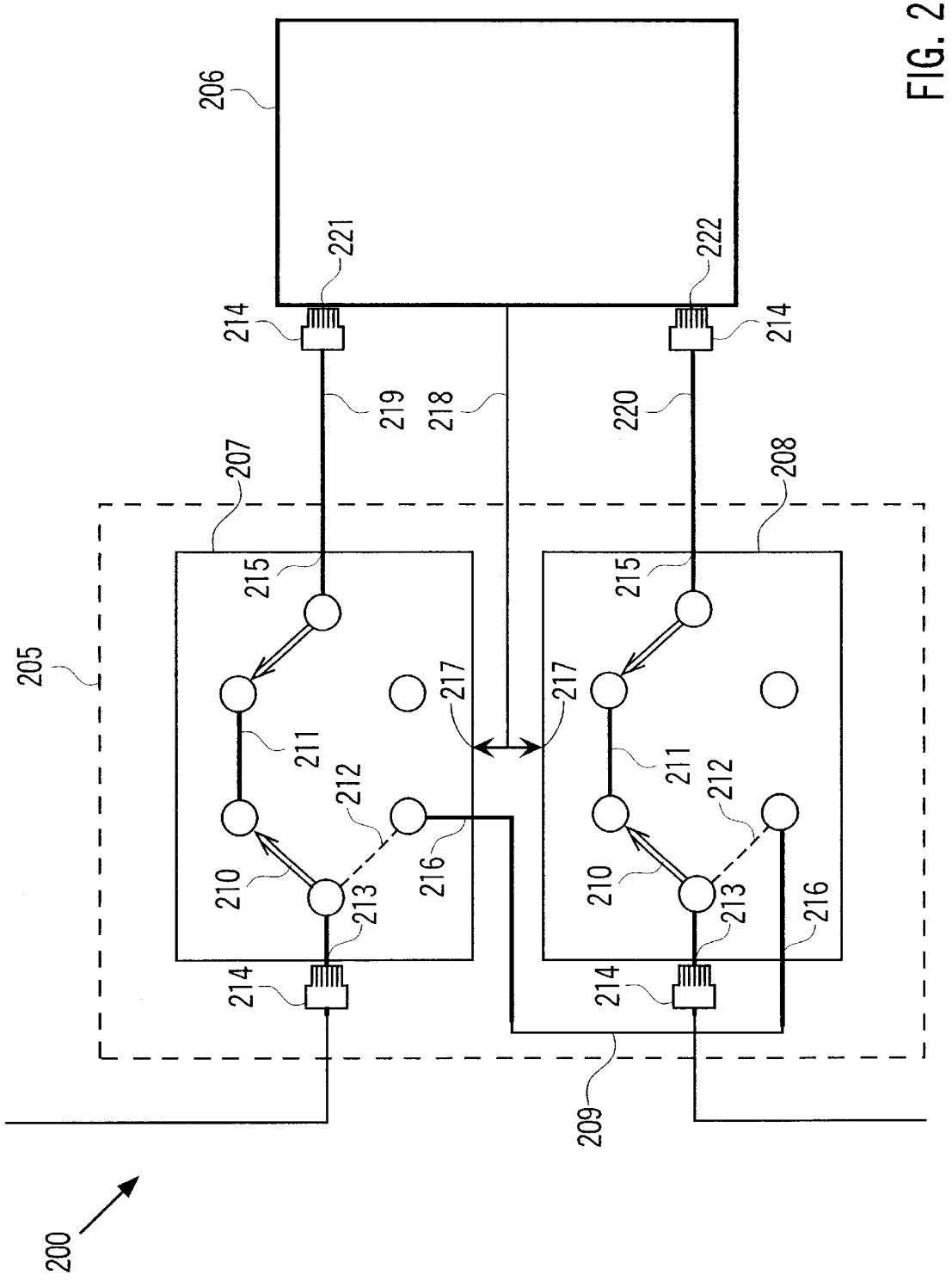
FIG. 2 shows an embodiment of a single bypass control mechanism.

In order to prevent interruption of customer network access and yet still maintain the critical bandwidth management service, a single bypass control mechanism for maintaining customer network access was developed. One embodiment of the single bypass control mechanism 200 is shown in FIG. 2. The single bypass control mechanism for maintaining customer network access 200 includes a bypass control module 205 and a bandwidth management control module 206.

The bypass control module 205 comprises a first bypass switch mechanism 207, a second bypass switch mechanism 208, and a bypass connector line 209 which connects the first bypass switch mechanism 207 to the second bypass switch mechanism 208. The first and second bypass switch mechanisms 207 and 208 each include a first bi-directional port 213, a second bi-directional port 215, a third bi-directional port 216, a bypass control signal input port 217, a first path 211 connecting the first bi-directional port 213 to the second bi-directional port 215, a second path 212 connecting the first bi-directional port 213 to the third bi-directional port 216, and a bypass switch 210 which alternates between the first path 211 and second path 212. The first and second bypass switch mechanisms 207 and 208 also have port connectors 214 at their respective bi-directional ports 213.

The bandwidth management control module 206 comprises a first bi-directional port 221, a second bi-directional port 222, and a bypass control signal line 218. The bypass control signal line 218 transports a bypass control signal from the bandwidth management control module 206 to the first and second bypass switch mechanisms 207 and 208. The first bypass control signal enters the first and second bypass switch mechanisms 207 and 208 at their respective bypass control signal input ports 217. The bandwidth management control module 206 also has port connectors 214 at bi-directional ports 221 and 222.

If the bandwidth management control module 206 functions properly, the bypass control signal is transmitted to the bypass control module 205 along the bypass control signal line 209. The bypass control signal is received at the first and second bypass switch mechanisms 207 and 208 causing the bypass switch 210 to close and complete the first path 211 of the first and second bypass switch mechanisms 207 and 208.

If the bandwidth management control module 206 is not functioning properly or fails, the bandwidth management control module 206 no longer transmits the bypass control signal to the bypass control module 205. When the bypass control signal is no longer being transmitted to the bypass control module 205, the bypass switch 212 in the first and second bypass switch mechanisms 207 and 208 switch to close and complete the second path 212. Since the second path 212 is closed, the network signal enters the first bypass switch mechanism 207 through the first bi-directional port 213, travels along the second path 212, and is output through the third bi-directional port 216. The network signal is then transported to the third bi-directional port 216 of the second bypass switch mechanism 208 along the bypass connector line 209. The network signal then travels through the second path 212 of the second bypass switch mechanism 208, and is output through the first bi-directional port 213.

Although the single bypass control mechanism for maintaining customer network access 200 provides a solution to maintaining customer network access whenever a bandwidth management control module fails, the network service providers still lose all their critical bandwidth data. A solution is needed that allows network service providers to collect their critical bandwidth management data, yet maintain customer network access upon failure of the bandwidth management control unit. The present invention, a serial redundant bypass control mechanism for maintaining bandwidth management data achieves that goal.

Figure 3A:
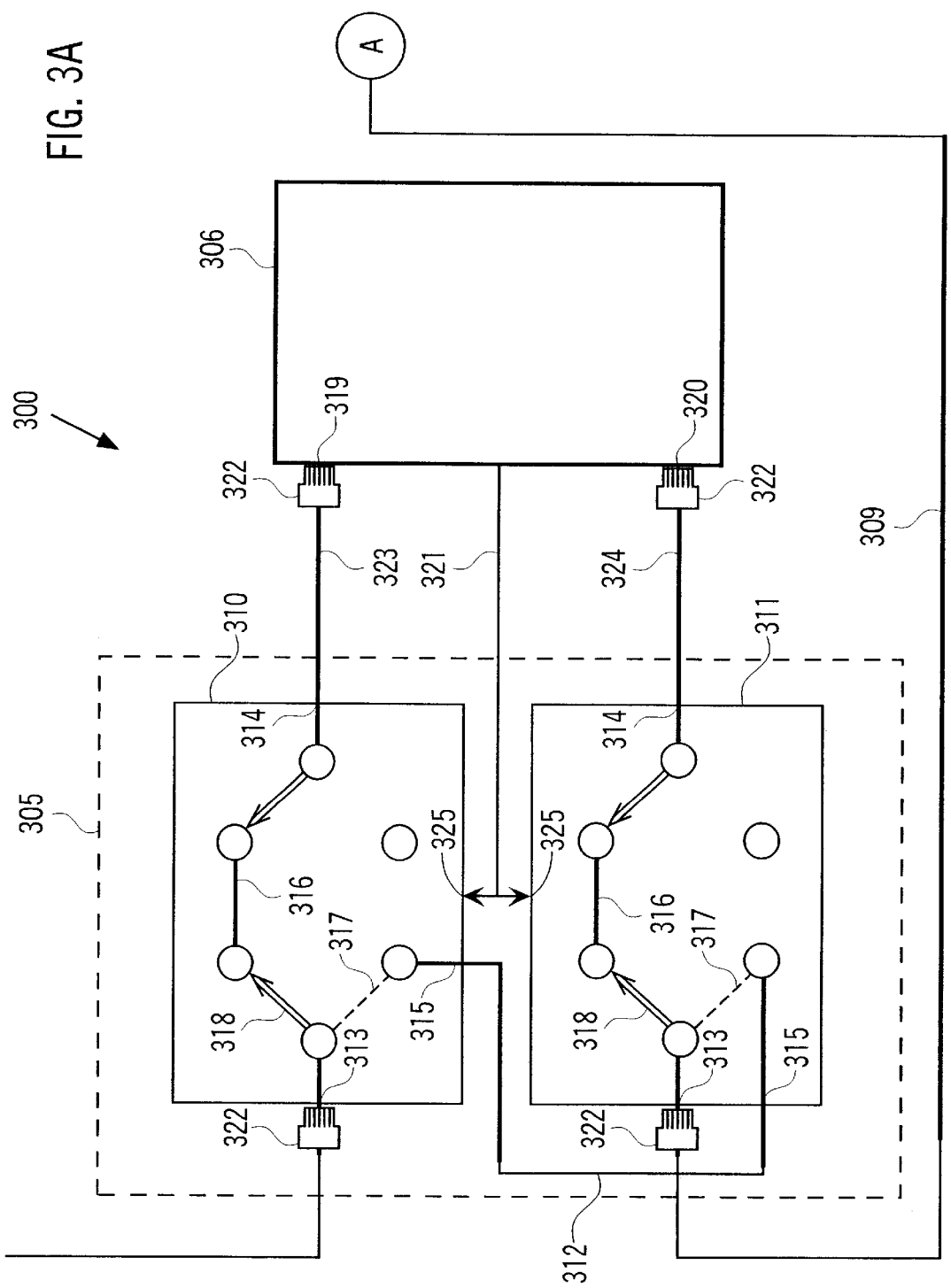
FIG. 3 shows an embodiment of the serial redundant bypass control mechanism for maintaining network bandwidth management service in accordance with the present invention.
Figure 3B:
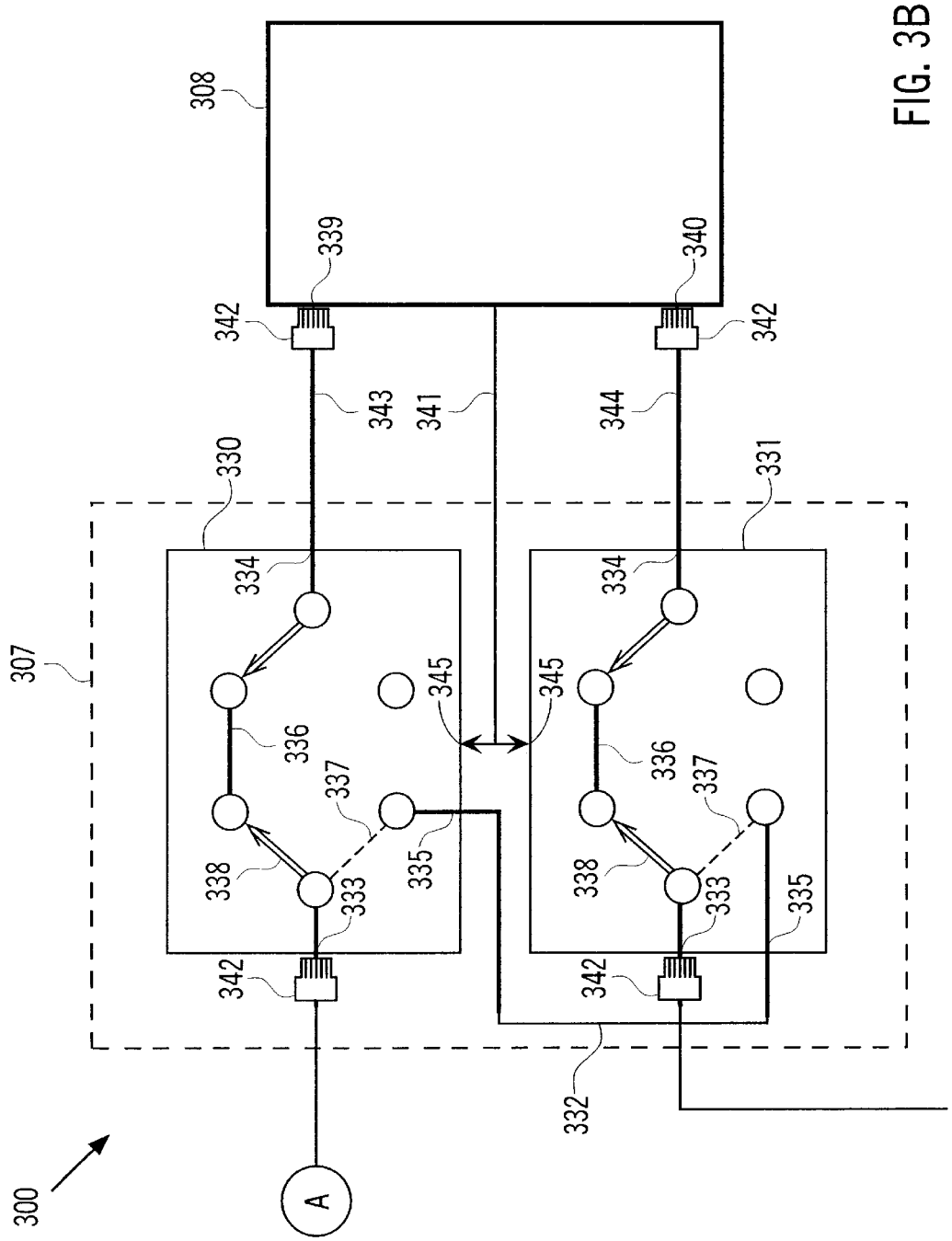

FIG. 3 shows one embodiment of the serial redundant bypass control mechanism for maintaining bandwidth management service 300 according to the present invention. The serial redundant bypass control mechanism for maintaining bandwidth management service works in both an Ethernet and ATM network communications environment. The serial redundant bypass control mechanism for maintaining network bandwidth management service 300 includes a first bypass control module 305, a first bandwidth management control module 306, a second bypass control module 307, and a second bandwidth management control module 308. A first bypass connector line 309 connects the first bypass control module 305 to the second bypass control module 307. The first bypass control module 305 comprises a first bypass switch mechanism 310, a second bypass switch mechanism 311, and a second bypass connector line 312 which connects the first bypass switch mechanism 310 to the second bypass switch mechanism 311. The first and second bypass switch mechanisms 310 and 311 each include a first bi-directional port 313, a second bi-directional port 314, a third bi-directional port 315, a bypass control signal input port 325, a first path 316 connecting the first bi-directional port 313 to the second bi-directional port 314, a second path 317 connecting the first bi-directional port 313 to the third bi-directional port 315, and a bypass switch 318 which alternates between the first path 316 and second path 317. The first and second bypass switch mechanisms 310 and 311 also have port connectors 322 at their respective bi-directional ports 313.

The first bandwidth management control module 306 comprises a first bi-directional port 319, a second bi-directional port 320, and a first bypass control signal line 321. The first bypass control signal line 321 transports a first bypass control signal from the first bandwidth management control module 306 to the first and second bypass switch mechanisms 310 and 311 of the first bypass control module 305. The first bypass control signal enters the first and second bypass switch mechanisms 310 and 311 at their respective bypass control signal input ports 325. The first bandwidth management control module 306 also has port connectors 322 at bi-directional ports 319 and 320.

The second bypass control module 307 comprises a third bypass switch mechanism 330, a fourth bypass switch mechanism 331, and a third bypass connector line 332 which connects the third bypass switch mechanism 330 to the fourth bypass switch mechanism 331. The third and fourth bypass switch mechanisms 330 and 331 each include a first bi-directional port 333, a second bi-directional port 334, a third bi-directional port 335, a bypass control signal input port 345, a first path 336 connecting the first bi-directional port 333 to the second bi-directional port 334, a second path 337 connecting the first bi-directional port 333 to the third bi-directional port 335, and a bypass switch 338 which alternates between the first path 336 and the second path 337. The third and fourth bypass switch mechanisms 330 and 331 also have port connectors 342 at their respective bi-directional ports 333.

The second bandwidth management control module 308 comprises a first bi-directional port 339, a second bi-directional port 340, and a second bypass control signal line 341. The second bypass control signal line 341 transports a second bypass control signal to the third and fourth bypass switch mechanisms 330 and 331 of the second bypass control module 307. The second bypass control signal enters the third and fourth bypass switch mechanisms 330 and 331 at their respective bypass control signal input ports 345. The second bandwidth management control module 308 also has port connectors 342 at bi-directional ports 339 and 340.

When the first bandwidth management control module 306 is functioning properly, the first bypass control signal is on and is transmitted to the first bypass control module 305 along the first bypass control signal line 321. The first bypass control signal is received at the first and second bypass switch mechanisms 310 and 311. Since the bypass control signal is on, the bypass switch 318 is closed and completes the first path 316 of the first and second bypass switch mechanisms 310 and 311. Likewise, when the second bandwidth management control module 308 is functioning properly, the second bypass control signal is on and is transmitted to the second bypass control module 307 along the second bypass control signal line 341. The second bypass control signal is received at the third and fourth bypass switch mechanisms 330 and 331. Since the bypass control signal is on, the bypass switch 318 is closed and completes the first path 336 of the third and fourth bypass switch mechanisms 330 and 331.

In one embodiment, where both the first and second bandwidth management control modules 306 and 308 are functioning properly, a network signal first enters the first bypass switch mechanism 310 through the first bi-directional port 313 and travels along the first path 316. The network signal may be received from a network router 105, a network switch 110, or another source. The network signal is then output through the second bi-directional port 314 and transported to the first bi-directional port 319 of the first bandwidth management control module 306 on a first network connector line 323. The first bandwidth management control module 306 then performs bandwidth management services on the network signal. The first bandwidth management control module 306 then outputs the network signal through a second bi-directional port 320 and transports the network signal to the first bypass control module 305 through a second network connector line 324.

Next, the network signal enters the second bypass switch mechanism 311 through the second bi-directional port 314. The network signal is then transported through the first path 316 of the second bypass switch mechanism 311, output through the first bi-directional port 313, and transported to the second bypass control module 307 through the first bypass connector line 309.

The network signal next enters the third bypass switch mechanism 330 through the first bi-directional port 333. The network signal then travels along the first path 336 of the third bypass switch mechanism 330 and is output through the second bi-directional port 334. Next, the network signal travels to the second bandwidth management control module 308 on a third network connector line 343. At the second bandwidth management control module 308, the network signal is received through the first bi-directional port 339. Since bandwidth management services have already been performed on the network signal, the network signal is output through the second bi-directional port 340 of the second bandwidth management control module 308. The network signal then travels along a fourth network connector line 344 back to the second bypass control module 307.

The network signal enters the fourth bypass switch mechanism 331 of the second bypass control module 307 through the second bi-directional port 334. The network signal then travels along the first path 336 of the fourth bypass switch mechanism 331 and is finally output through the first bi-directional port 333. The network signal may be output to a network switch 110, a network router 105, or another source.

In another embodiment, where the first bandwidth management control module 306 is not functioning properly or fails, the first bandwidth management control module3 s 306 failure detection system causes the first bypass control signal to be turned off. The bandwidth management control module's 306 failure detection system is discussed in detail in FIG. 4. Thus, the first bandwidth management control module 306 no longer transmits the first bypass control signal to the first bypass control module 305. When the first bypass control signal is no longer being transmitted to the bypass control module 305, the bypass switch 318 in the first and second bypass switch mechanisms 310 and 311 open to complete the second path 317. The network signal then enters the first bypass switch mechanism 310 through the first bi-directional port 313, travels along the second path 317, and is output through the third bi-directional port 315. The network signal is then transported to the third bi-directional port 315 of the second bypass switch mechanism 311 along a second bypass connector line 312. The network signal then travels through the second path 317 of the second bypass switch mechanism 311, output through the first bi-directional port 313, and is transported to the second bypass control module 307 through the first bypass connector line 309.

The network signal enters the third bypass switch mechanism 330 through the first bi-directional port 333. Since the second bypass control signal transmitted by the second bandwidth management control module 308 is on, the bypass switch 338 is closed and completes the first path 336 of the third bypass switch mechanism 330. Thus, the network signal travels along the first path 336 of the third bypass switch mechanism 330 and is output through the second bi-directional port 334. The network signal then travels to the second bandwidth management control module 308 on a third network connector line 343. At the second bandwidth management control module 308, the network signal is received through the first bi-directional port 339. The second bandwidth management control module 308 then performs bandwidth management service on the network signal. The second bandwidth management control module 308 then outputs the network signal through a second bi-directional port 340 and transports the network signal back to the second bypass control module 307 through a fourth network connector line 344.

Next, the network signal enters the fourth bypass switch mechanism 331 through the second bi-directional port 334. The network signal then travels along the first path of the fourth bypass switch mechanism 331 and is finally output through the first bi-directional port 333. The network signal may be output to a network switch 110, a network router 105, or another source.

In another embodiment, where both the first and second bandwidth management control modules 306 and 308 are functioning properly, a network signal first enters the fourth bypass switch mechanism 331 through the first bi-directional port 333 and travels along the first path 336. The network signal may be received from a network router 105, a network switch 110, or another source. The network signal is then output through the second bi-directional port 334 and transported to the second bi-directional port 340 of the second bandwidth management control module 308 on a fourth network connector line 344. The second bandwidth management control module 308 then performs bandwidth management service on the network signal. The second bandwidth management control module 308 then outputs the network signal through a first bi-directional port 339 and transports the network signal to the second bypass control module 307 through a third network connector line 343.

The network signal next enters the third bypass switch mechanism 330 through the second bi-directional port 334. The network signal is then transported through the first path 336 of the third bypass switch mechanism 330, output through the first bi-directional port 333, and transported to the first bypass control module 305 through the first bypass connector line 309.

The network signal enters the second bypass switch mechanism 311 through the first bi-directional port 313. The network signal then travels along the first path 316 of the second bypass switch mechanism 311 and is output through the second bi-directional port 314. The network signal next travels to the first bandwidth management control module 306 on a second network connector line 324. At the first bandwidth management control module 306, the network signal is received through the second bi-directional port 320. Since bandwidth management services have already been performed on the network signal, the first bandwidth management control module 306 outputs the network signal through the first bi-directional port 319. The network signal then travels along a first network connector line 323 to the first bypass control module 305.

The network signal enters the first bypass switch mechanism 310 of the first bypass control module 305 through the second bi-directional port 314. The network signal then travels along the first path 316 of the first bypass switch mechanism 310 and is finally output through the first bi-directional port 313. The network signal may be output to a network router 105, a network switch 110, or another source.

In another embodiment, where the second bandwidth management control module 308 is not functioning properly or fails, the second bandwidth management control module's 308 failure detection system causes the second bypass control signal to be turned off. Thus, the second bandwidth management control module 308 no longer transmits the second bypass control signal to the second bypass control module 307. When the second bypass control signal is no longer being transmitted to the second bypass control module 307, the bypass switch 338 in the third and fourth bypass switch mechanisms 330 and 331 open to complete the second path 337 of the third and fourth bypass switch mechanisms 330 and 331. The network signal then enters the fourth bypass switch mechanism 331 through the first bi-directional port 333, travels along the second path 317, and is output through the third bi-directional port 335. The network signal is then transported to the third bi-directional port 335 of the third bypass switch mechanism 330 along the third bypass connector line 332. The network signal is then transported through the second path 317 of the third bypass switch mechanism 330, output through the first bi-directional port 313, and transported to the first bypass control module 305 through the first bypass connector line 309.

The network signal next enters the second bypass switch mechanism 311 through the first bi-directional port 313. Since the bypass control signal transmitted by the first bandwidth management control module 306 is active, the bypass switch 318 is closed and completes the first path 316 of the second bypass switch mechanism 311. Thus, the network signal travels along the first path 316 of the second bypass switch mechanism 311 and is output through the second bi-directional port 314. The network signal then travels to the first bandwidth management control module 306 on the second network connector line 324. At the first bandwidth management control module 306, the network signal is received through the second bi-directional port 320. Next, the first bandwidth management control module 306 performs bandwidth management service on the network signal. The first bandwidth management control module 306 then outputs the network signal through the first bi-directional port 319 and transports the network signal back to the first bypass control module 305 through the first network connector line 323.

The network signal next enters the first bypass switch mechanism 310 through the second bi-directional port 314. The network signal then travels along the first path 316 of the first bypass switch mechanism 331 and is finally output through the first bi-directional port 313. The network signal may be output to a network switch 110, a network router 105, or another source.

Figure 4:
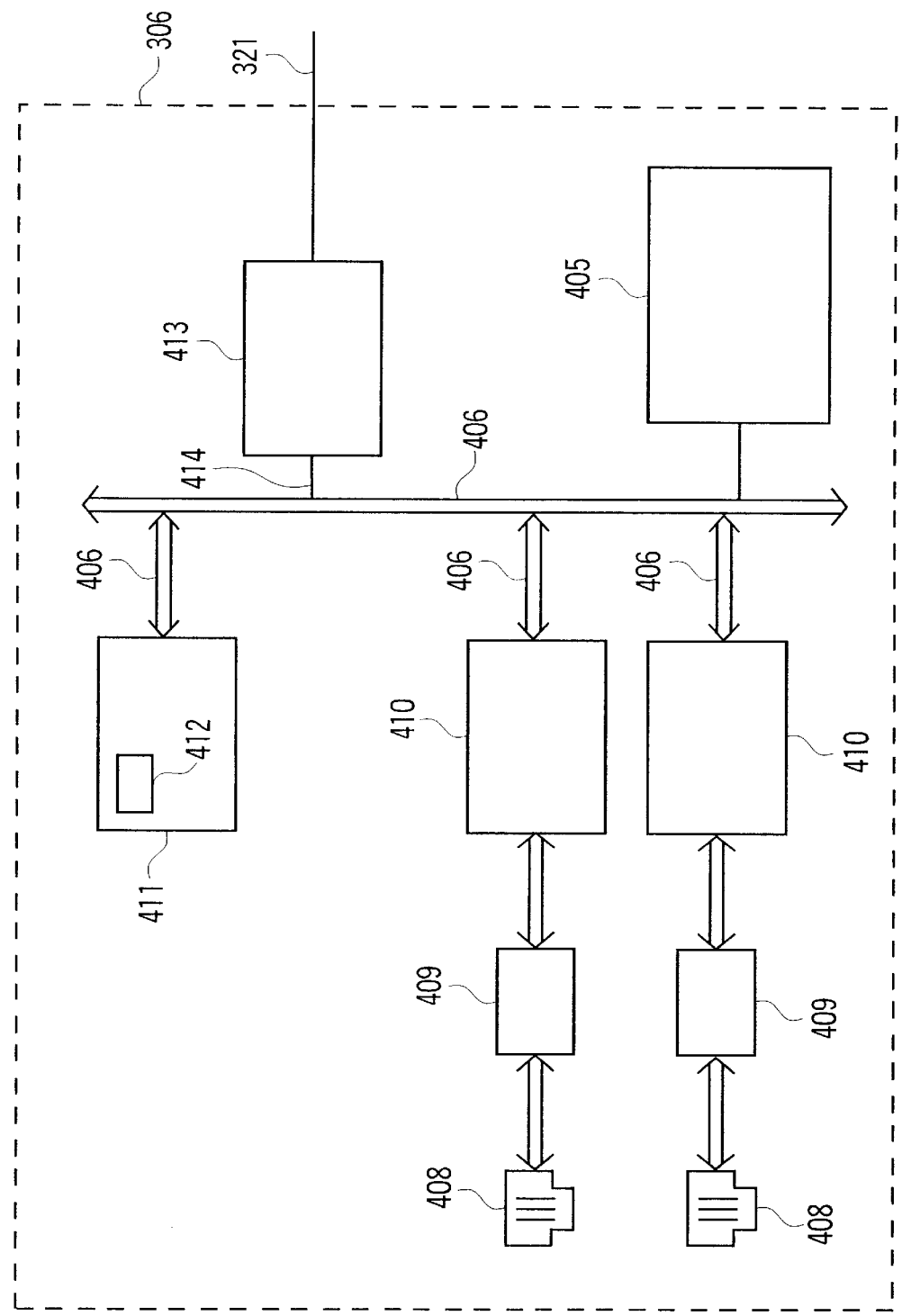
FIG. 4 shows a block diagram of one embodiment of the bandwidth management control module's failure detection system.

The failure of either the first bandwidth management control module 306 or the second bandwidth management control module 308 can be due to a pure hardware, pure software, or a combination software/hardware problem. Examples of each kind of failure can be explained using FIG. 4. FIG. 4 shows a module block diagram of one embodiment of the bandwidth management control module's failure detection system for either bandwidth management control module 306 or 308. The bandwidth management control module detection system comprises a CPU 411, a timer 412 located on the CPU 414, a power supply 405, a network interface controller 413, an internal bypass control disable signal 414, multiple media access controllers 410, multiple PHYs 409, multiple activity monitors 408 which monitor the network activity in the PHYs 409, and multiple PCI buses 406.

As explained before, when the first and second bandwidth management control modules 306 and 308 are functioning properly, the first and second bypass control signals are on. In one example, the first bypass control signal is a steady state 5 volt signal generated from the network interface controller 413. Note that the first bypass control signal could be generated from another source. When a failure occurs within the first bandwidth management control module 306, an internal bypass control disable signal 414 is generated and transmitted to the network interface controller 413. The internal bypass control disable signal 414 causes the first bypass control signal to drop from 5 volts to 0 volts, thus disabling the first bypass control signal. Note that the second bandwidth management control module's 308 failure detection system works exactly the same as the first bandwidth management control module's 306. The internal bypass control disable signal can be generated from a different source depending on whether the failure is a pure software failure, or a combination software/hardware failure.

A pure software induced failure within the first bandwidth management control module 306 can occur when the software over rides the failure detection system and forces a bypass event. In this case, the software generates an internal bypass control disable signal 414 from any general purpose register within the first bandwidth management control module 306 and transmits it to the network interface controller 413, thus disabling the first bypass control signal and causing a bypass event as explained in FIG. 3.

A failure may also occur due to a combination software/hardware problem. For example, the CPU 411 of the bandwidth management control module 306 is constantly running software control loops to manage and monitor the processing of network data packets. Under normal conditions, if the software control loop completes the loop, the software re-triggers a timer 412. The timer 412 may be located on the CPU 411. If the control software malfunctions and the software does not complete it's control loop, the timer 412 is not re-triggered. If the timer 412 is not re-triggered, even for a matter of milliseconds, the timer 412 generates an internal bypass control disable signal 414 and transmits it to the network interface controller 413, thus disabling the first bypass control signal and causing a bypass event as explained in FIG. 3.

Following is another example of a combination hardware/software failure. Software processed in the CPU 411 communicates with the media access controller 410 of the first bandwidth management control module 306 through the PCI bus 406 and thus is able to monitor for any failures. However, the software is not able to monitor any activity in the PHY 409 since it contains a mix of analog and digital circuitry. In order to monitor failures within the PHY 409, activity monitors 408 have been placed at the PHY 409 level interface. If the activity monitors 408 detect a failure in the PHY 409, the activity monitor 408 generates an internal bypass control disable signal 414 and transmits it to the network interface controller 413, thus disabling the first bypass control signal and causing a bypass event as explained in FIG. 3.

A first bandwidth management control module failure may also occur due to a pure hardware problem. As stated before, when the first bandwidth management control module is functioning properly, the network interface controller 413 generates a first bypass control signal and transmits it to the first bypass control module 310. Again, the first bypass control signal can be a 5 volt steady state signal. If the power supply 405 which supplies power to the first bandwidth management control module 306 fails, power is no longer being supplied to the network interface controller 413, thus the steady state signal drops to 0 volts and disables the first bypass control signal causing a bypass event as explained in FIG. 3.

When a pure hardware, pure software, or combination hardware/software failure occurs in the first or second bandwidth management control modules 306 or 308, an alert is transmitted from the bandwidth management control modules 306 or 308 alerting a network administrator or an interested party of the failure. The network administrator can then immediately change the data collection responsibility to the redundant bandwidth management control module. The failed bandwidth management control module may then be replaced.

In summary, the serial redundant bypass control mechanism for maintaining network bandwidth management service includes a first and second bypass control module, a frst and second bandwidth management control module, and a first bypass connector line connecting the first bypass control module to the second bypass control module. Under normal conditions, a network signal is received at the first bypass control module and transported to the first bandwidth management control module. The first bandwidth management control module performs bandwidth management services on the network signal and transports the network signal back to the first bypass control module. The first bypass control module then transports the network signal to the second bypass control module along the first bypass connector line. Next, the second bypass control module transports the network signal to the second bandwidth management control module. Since bandwidth management services have already been performed on the network signal, the second bandwidth management control module transports the network signal back to the second bypass control module. The second bypass control module then outputs the network signal.

If the first bandwidth management control module fails, the network signal is received at the first bypass control module and transported directly to the second bypass control module along the first bypass connector line, thus bypassing the failed first bandwidth management control module. The network signal is then transported to the second bandwidth management control module where bandwidth management services are performed. The second bandwidth management control module then transports the network signal back to the second bypass control module and outputs the network signal.

Although the present invention has been described in detail, it should be understood that various changes, substitutions and alterations can be made hereto without departing from the spirit and scope of the invention as described by the appended claims.

What is claimed is:

1. A serial redundant bypass control system for maintaining network bandwidth management service, comprising:
   a first bandwidth management control module for performing bandwidth management control service on a network signal;
   a second bandwidth management control module for performing bandwidth management service on the network signal;
   a first bypass control module for transporting the network signal to and from the first bandwidth management control module and for bypassing the first bandwidth management control module upon failure of the first bandwidth management control module;
   a second bypass control module for transporting the network signal to and from the second bandwidth management control module and for bypassing the second bandwidth management control module upon failure of the second bandwidth management control module; and
   a first bypass connector line for transporting the network signal between the first and second bypass control modules;
   wherein the first bypass control module comprises:
      a first bypass switch mechanism;
      a second bypass switch mechanism; and
      a second bypass connector line for transporting the network signal between the first and second bypass switch mechanisms upon failure of the first bandwidth management control module; and
   wherein the first and second bypass switch mechanisms each comprise:
      a first, second and third bi-directional port for receiving and outputting the network signal;
      a bypass control signal input port for receiving a bypass control signal from the first bandwidth management control module;
      a first path connecting the first bi-directional port to the second bi-directional port;
      a second path connecting the first bi-directional port to the third bi-directional port; and
      a bypass switch for alternating between the first and second paths.

2. A serial redundant bypass control system for maintaining network bandwidth management service, comprising:
   a first bandwidth management control module for performing bandwidth management control service on a network signal;
   a second bandwidth management control module for performing bandwidth management service on the network signal;
   a first bypass control module for transporting the network signal to and from the first bandwidth management control module and for bypassing the first bandwidth management control module upon failure of the first bandwidth management control module;
   a second bypass control module for transporting the network signal to and from the second bandwidth management control module and for bypassing the second bandwidth management control module upon failure of the second bandwidth management control module; and
   a first bypass connector line for transporting the network signal between the first and second bypass control modules;
   wherein the second bypass control module comprises:
      a first bypass switch mechanism;
      a second bypass switch mechanism; and
      a second bypass connector line for transporting the network signal between the first and second bypass switch mechanisms upon failure of the second bandwidth management control module; and
   wherein the first and second bypass switch mechanisms each comprise:
      a first, second and third bi-directional port for receiving and outputting the network signal;
      a bypass control signal input port for receiving a bypass control signal from the second bandwidth management control module;
      a first path connecting the first bi-directional port to the second bi-directional port;
      a second path connecting the first bi-directional port to the third bi-directional port; and
      a bypass switch for alternating between the first and second paths.

3. A method for maintaining network bandwidth management service using a serial redundant bypass control mechanism comprising a first and second bandwidth management control module, comprising the steps of:
   using a first bypass control module to mute a network signal around the first bandwidth management control module upon failure of the first bandwidth management control module;
   transporting the network signal from the first bypass control module to a second bypass control module along a first bypass connector line;
   transporting the network signal from the second bypass control module to the second bandwidth management control module;
   transporting the network signal from the second bandwidth management control module to the second bypass control module; and
   outputting the network signal from the second bypass control module;
   wherein the first bypass control module comprises:
      a first bypass switch mechanism;
      a second bypass switch mechanism; and
      a second bypass connector line for transporting the network signal between the first and second bypass switch mechanisms upon failure of the first bandwidth management control module; and
   wherein the first and second bypass switch mechanisms each comprise:
      a first, second, and third bi-directional port for receiving and outputting the network signal;
      a bypass control signal input port for receiving the first bypass control signal from the first bandwidth management control module;

a first path connecting the first bi-directional port to the second bi-directional port;

a second path connecting the first bi-directional port to the third bi-directional port; and a bypass switch for alternating between the first and second paths.

4. A method for maintaining network bandwidth management service using a serial redundant bypass control mechanism comprising a first and second bandwidth management control module, comprising the steps of:

using a first bypass control module to mute a network signal around the first bandwidth management control module upon failure of the first bandwidth management control module;

transporting the network signal from the first bypass control module to a second bypass control module along a first bypass connector line;

transporting the network signal from the second bypass control module to the second bandwidth management control module;

transporting the network signal from the second bandwidth management control module to the second bypass control module; and outputting the network signal from the second bypass control module;

wherein the second bypass control module comprises:
a first bypass switch mechanism;
a second bypass switch mechanism; and
a second bypass connector line for transporting the network signal between the first and second bypass switch mechanisms upon failure of the first bandwidth management control module; and wherein the first and second bypass switch mechanisms each comprise:
a first, second, and third bi-directional port for receiving and outputting the network signal;
a bypass control signal input port for receiving the first bypass control signal from the first bandwidth management control module;
a first path connecting the first bi-directional port to the second bi-directional port;
a second path connecting the first bi-directional port to the third bi-directional port; and
a bypass switch for alternating between the first and second paths.

5. A method for maintaining network bandwidth management service using a serial redundant bypass control mechanism comprising a first and second bandwidth management control module, comprising the steps of:

using a first bypass control module to mute a network signal around the first bandwidth management control module upon failure of the first bandwidth management control module;

transporting the network signal from the first bypass control module to a second bypass control module along a first bypass connector line;

transporting the network signal from the second bypass control module to the second bandwidth management control module;

transporting the network signal from the second bandwidth management control module to the second bypass control module; and outputting the network signal from the second bypass control module;

automatically switching the bypass switch of the first and second bypass switch mechanisms located in the first bypass control module from the first path to the second path upon failure of the first bandwidth management control module; and transporting the network signal from the first bypass control module to the second bypass control module comprising the steps of:
receiving the network signal at the first bypass switch mechanism of the first bypass control module;
transporting the network signal through the second path of the first bypass switch mechanism;
transporting the network signal to the second bypass switch mechanism of the first bypass control module through the second bypass connector line;
transporting the network signal through the second path of the second bypass switch mechanism; and
transporting the network signal from the second bypass switch mechanism to the second bypass control module through the first bypass connector line.

6. A method for maintaining network bandwidth management service using a serial redundant bypass control mechanism comprising a first and second bandwidth management control module, comprising the steps of:

using a first bypass control module to mute a network signal around the first bandwidth management control module upon failure of the first bandwidth management control module;

transporting the network signal from the first bypass control module to a second bypass control module along a first bypass connector line;

transporting the network signal from the second bypass control module to the second bandwidth management control module;

transporting the network signal from the second bandwidth management control module to the second bypass control module; and outputting the network signal from the second bypass control module;

automatically switching the bypass switch of the first and second bypass switch mechanisms located in the second bypass control module from the first path to the second path upon failure of the first bandwidth management control module; and transporting the network signal from the second bypass control module to the first bypass control module comprising the steps of:
receiving the network signal at the second bypass switch mechanism of the second bypass control module;
transporting the network signal through the second path of the second bypass switch mechanism;
transporting the network signal to the first bypass switch mechanism of the second bypass control module through the first bypass connector line;
transporting the network signal through the second path of the first bypass switch mechanism; and
transporting the network signal from the second bypass switch mechanism to the first bypass control module through the first bypass connector line.

7. The serial redundant bypass control system for maintaining network bandwidth management service of claim 1, wherein serial redundant bypass control system for maintaining network bandwidth management service works in both an Ethernet and ATM network communications environment.

* * * * *